US012783116B2

(12) United States Patent
Wang et al.

(10) Patent No.: US 12,783,116 B2
(45) Date of Patent: Nov. 3, 2026

(54) GRAPHICAL USER INTERFACE-BASED TENSOR GRAPH CONFIGURATION METHOD AND TENSOR GRAPH CONFIGURATION SYSTEM

(71) Applicant: MEDIATEK INC., Hsin-Chu (TW)

(72) Inventors: Chi-Wei Wang, Hsinchu City (TW); Yen-Ting Chiang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 224 days.

(21) Appl. No.: 18/670,712

(22) Filed: May 21, 2024

(65) Prior Publication Data

US 2025/0362793 A1 Nov. 27, 2025

(51) Int. Cl.

*G06F 3/04847* (2022.01)
*G06F 3/04845* (2022.01)
*G06T 11/26* (2026.01)

(52) U.S. Cl.

CPC ...... *G06F 3/04847* (2013.01); *G06F 3/04845* (2013.01); *G06T 11/26* (2026.01); *G06T 2200/24* (2013.01)

(58) Field of Classification Search

CPC .... G06F 3/04847; G06F 3/04845; G06F 8/34; G06F 3/0484; G06F 9/5061; G06T 11/26; G06T 2200/24; G06N 3/02; G06N 3/045; G06N 3/0464; G06N 3/063; G06N 3/08; G06N 3/105; G06N 5/022

See application file for complete search history.

(56) References Cited

U.S. PATENT DOCUMENTS 10,216,704 B1 * 2/2019 Lu .......................... G06F 17/16
10,372,787 B2 * 8/2019 Park ..................... G06N 3/0464
12,254,416 B2 * 3/2025 Kolhe .................... G06N 3/063
12,423,891 B2 * 9/2025 Stranic .................. G06F 16/258
2014/0085325 A1 * 3/2014 Tsukada ................... G09G 5/02
345/589
2014/0310648 A1 * 10/2014 Braun ................. G06F 3/04817
715/800
2015/0312508 A1 * 10/2015 Phang ............. H04N 21/42224
348/552
2015/0324101 A1 * 11/2015 Roesch .............. G06F 3/04847
715/771

(Continued)

FOREIGN PATENT DOCUMENTS

CN 110618814 A 12/2019
CN 110659325 A 1/2020

(Continued)

*Primary Examiner* — Kenny Nguyen
(74) *Attorney, Agent, or Firm* — Winston Hsu

(57) ABSTRACT

A tensor graph configuration method includes providing a tensor graph comprising a plurality of operation tasks through a graphical user interface (GUI), determining a sub-graph from the tensor graph based on commands input through the GUI, wherein at least one operation task is within the sub-graph, determining a tiling configuration for the sub-graph according to multiple target tensor sizes, wherein the multiple target tensor sizes are set for a final operation task in the sub-graph by a user through the GUI, and generating a tiled tensor graph according to the tiling configuration, wherein the tiled tensor graph at least comprises a plurality of operation sub-tasks split from a respective operation task in the sub-graph through the tiling.

16 Claims, 9 Drawing Sheets

(56) References Cited

U.S. PATENT DOCUMENTS

| | | | | |
|---|---|---|---|---|
| 2019/0188516 | A1* | 6/2019 | Porter | G06V 10/48 |
| 2021/0365522 | A1* | 11/2021 | Narita | G06N 3/084 |
| 2022/0121880 | A1* | 4/2022 | Buniatyan | G06F 18/2148 |
| 2022/0121959 | A1* | 4/2022 | Kolhe | G06N 3/063 |
| 2022/0309322 | A1* | 9/2022 | Nama | G06T 1/20 |
| 2022/0329407 | A1* | 10/2022 | Soceanu | H04L 9/008 |
| 2023/0053311 | A1* | 2/2023 | Aharoni | G06N 3/04 |
| 2024/0168913 | A1* | 5/2024 | Nama | G06F 15/7885 |
| 2024/0233222 | A1* | 7/2024 | Stranic | G06F 16/2264 |
| 2024/0371520 | A1* | 11/2024 | Vincent Salomon | G06V 20/695 |

FOREIGN PATENT DOCUMENTS

| | | | |
|---|---|---|---|
| CN | 112585544 | A | 3/2021 |
| CN | 117709400 | A | 3/2024 |

* cited by examiner

GRAPHICAL USER INTERFACE-BASED TENSOR GRAPH CONFIGURATION METHOD AND TENSOR GRAPH CONFIGURATION SYSTEM

BACKGROUND

With the development of technology, a convolutional neural network (CNN) is recognized as one of the most remarkable neural networks achieving significant success in machine learning, such as image recognition, image classification, speech recognition, natural language processing, and video classification. Because of a large amount of data sets, intensive computational power, and higher demand for memory storage, the CNN architecture becomes more and more complicated and difficult to achieve a better performance. Therefore, a tensor graph can be introduced to illustrate tasks of the neural network as a factorable graph. However, if a size of a tensor is too large to fit into a cache of a tensor processor unit, accessing an entire tensor may thrash the cache, leading to additional dynamic random-access memory (DRAM) utilization requirement.

SUMMARY

In an embodiment of the present disclosure, a tensor graph configuration method is disclosed. The tensor graph configuration method comprises providing a tensor graph comprising a plurality of operation tasks through a graphical user interface (GUI), determining a sub-graph from the tensor graph based on commands input through the GUI, wherein at least one operation task is within the sub-graph, determining a tiling configuration for the sub-graph according to multiple target tensor sizes, wherein the multiple target tensor sizes are set for a final operation task in the sub-graph by a user through the GUI, and generating a tiled tensor graph according to the tiling configuration, wherein the tiled tensor graph at least comprises a plurality of operation sub-tasks split from a respective operation task in the sub-graph through the tiling.

In another embodiment of the present disclosure, a tensor graph configuration system is disclosed. The tensor graph configuration system comprises a memory, a graphical user interface device (GUI), and a processor. The memory is configured to save tensor graph data. The graphical user interface device is configured to provide a graphical user interface. The processor is coupled to the memory and the graphical user interface device and configured to adjust a tensor graph comprising a plurality of operation tasks. The processor determines a sub-graph from the tensor graph based on commands input through the GUI. At least one operation task is within the sub-graph. The processor determines a tiling configuration for the sub-graph according to multiple target tensor sizes. The multiple target tensor sizes are set for a final operation task in the sub-graph by a user through the GUI. The processor generates a tiled tensor graph according to the tiling configuration. The tiled tensor graph at least comprises a plurality of operation sub-tasks split from a respective operation task in the sub-graph through the tiling.

The present disclosure aims at providing a tensor graph configuration method and a tensor graph configuration system capable of performing an intuitively adjustment mechanism for processing a plurality of operation tasks. The claimed tensor graph configuration method and the tensor graph configuration system uses the GUI for generating the tiled tensor graph from the tensor graph based on the commands input through the GUI. As a result, since the tensor graph can be intuitively adjusted, the processing efficiency of the operation tasks can be improved.

These and other objectives of the present disclosure will no doubt become obvious to those of ordinary skill in the art after reading the following detailed description of the preferred embodiment that is illustrated in the various figures and drawings.

DETAILED DESCRIPTION

The machine code running on an AI accelerator within a mobile device (for example, mobile phones) is typically pre-compiled on a computer (such as, a complier). The compilation process involves transforming the source code written by developers into the machine code that the hardware of the AI accelerator can execute. The compilation process may include optimization steps, to ensure that the machine code operates efficiently on the AI accelerator. After the compilation and optimization are complete, the resulting machine code, also known as an executable or binary file, is deployed to the AI accelerator for execution on the mobile device. The present disclosure pertains to an optimization process, to enhance the execution efficiency of the resulting machine code on an AI accelerator, such as, efficient use of cache, reducing DRAM utilization requirement, and decreasing an execution period. Conventionally, users need to specify tiling through programming languages. However, it is hard for users to specify manually in a text-based environment since the complexity of a deep neural network may be extremely high. In an embodiment, the disclosure introduces a tensor graph configuration system/method that offers a user-friendly and intuitive technology to configure tiling and pipelining mechanisms through a graphical user interface (GUI). With the GUI showing the architecture (for example, tensor graph) of the deep neural network, users can select the part to tile and how to tile them from the tensor graph visually. Especially, with the data flow shown as the tiled tensor graph, the embodiment provides a way to insert or configure wake-up and wait signals or operations for users through the GUI to create pipeline. The proposed implementation can allow users to specify where and how to tile through GUI, moreover, can allow users to specify where to insert wake-up and wait signals through GUI.

Figure 1:
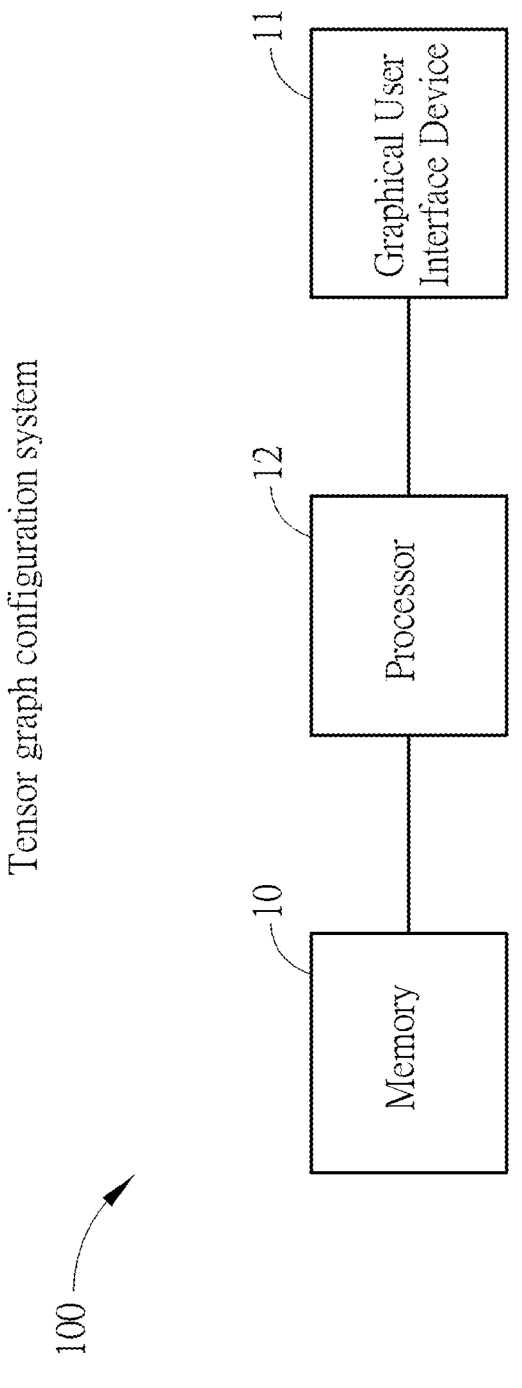
FIG. 1 illustrates a block diagram of a tensor graph configuration system according to an embodiment of the disclosure.

FIG. 1 illustrates a block diagram of a tensor graph configuration system 100 according to an embodiment of the disclosure. The tensor graph configuration system 100 can provide an intuitive method for adjusting tensor graph configurations. The tensor graph configuration system 100 includes a memory 10, a graphical user interface device 11, and a processor 12. The memory 10 is used for saving tensor graph data or source code, for example, a tensor graph can be derived from the tensor graph data by the processor 12. The graphical user interface device 11 can be used for providing a graphical user interface. For example, the graphical user interface device 11 can be a computer touch-screen capable of providing interactive operations to a user. The processor 12 is coupled to the memory 10 and the graphical user interface device 11. The processor 12 is configured to adjust the tensor graph through the graphical user interface, for example, in conjunction with the memory 10 and the graphical user interface device 11. Here, the tensor graph can include a plurality of operation tasks. In other words, the tensor graph can be regarded as a topology illustration of data processing flows of the plurality of operation tasks. In the tensor graph configuration system 100, the processor 12 is configured to provide a tensor graph through a graphical user interface (GUI) based on the data stored in the memory (such as, source codes for the tensor graph), wherein the tensor graph comprises a plurality of operation tasks, that is, the tensor graph to be adjusted is displayed on a screen through the GUI. Then, the processor 12 is configured to receive commands (such as user inputs) input through the GUI and determine a sub-graph from the tensor graph based on the commands input through the GUI. Then, the processor 12 can tile each operation task within the sub-graph according to multiple target tensor sizes set for the final operation task(s) within the sub-graph. For example, the multiple target tensor sizes for the final operation task(s) within the sub-graph are set through the GUI (for example, by users) and the final operation task(s) within the sub-graph may be determined to be split into multiple operation sub-tasks based on the multiple tensor sizes, wherein an original tensor size of the final operation task is a sum of the multiple target tensor sizes set for that task. Then, a pre-set backward shape derivation algorithm, which is designed to infer the appropriate tensor sizes and operation (OP) attributes in a reverse manner, starting from the final operation task within the sub-graph and moving towards the initial operation task within the sub-graph, will derive backward the correct tensor sizes and OP attributes for the rest operation tasks in the sub-graph. Hence, a tiling configuration for all operation tasks within the sub-graph can be determined based on the multiple target tensor sizes specified by users via the GUI for the final operation task(s) in the sub-graph. Further, the processor 12 is configured to generate a tiled tensor graph through GUI according to the tiling configuration, wherein in the tiled tensor graph, each of the operation tasks within the sub-graph is tiled, that is, each of the operation tasks with the sub-graph is split into multiple operation sub-tasks. In the embodiment, the term "OP" may be utilized interchangeably to denote either an operation task or an operation sub-task. In the embodiment, the multiple operation sub-tasks corresponding to one operation task are collectively configured to perform the identical function as that of the original operation task. The tiled tensor graph at least includes a plurality of operation sub-tasks after each of the operation tasks within the sub-graph is tiled. The updated (tiled) tensor graph is saved to the memory 10. Further, the processor 12 is configured to insert or configure wake-up signals and wait signals for the tiled tensor graph (particularly for two corresponding OPs that are adjacent in the data flow) for establishing a pipelining mechanism through the graphical user interface. In the embodiment, the two corresponding OPs are executed by different hardware devices. In one example, the different hardware devices can be specified by users through GUI. In another example, the different hardware devices can be determined according to the function which the corresponding OPs is intended to perform. In the tensor graph, OPs implemented by different hardware device can be distinctly displayed, for example, by utilizing different background colors, thereby enabling users to conveniently establish a pipeline through the GUI. Details of performing the tensor graph configuration by the tensor graph configuration system 100 are illustrated below.

Figure 2B:
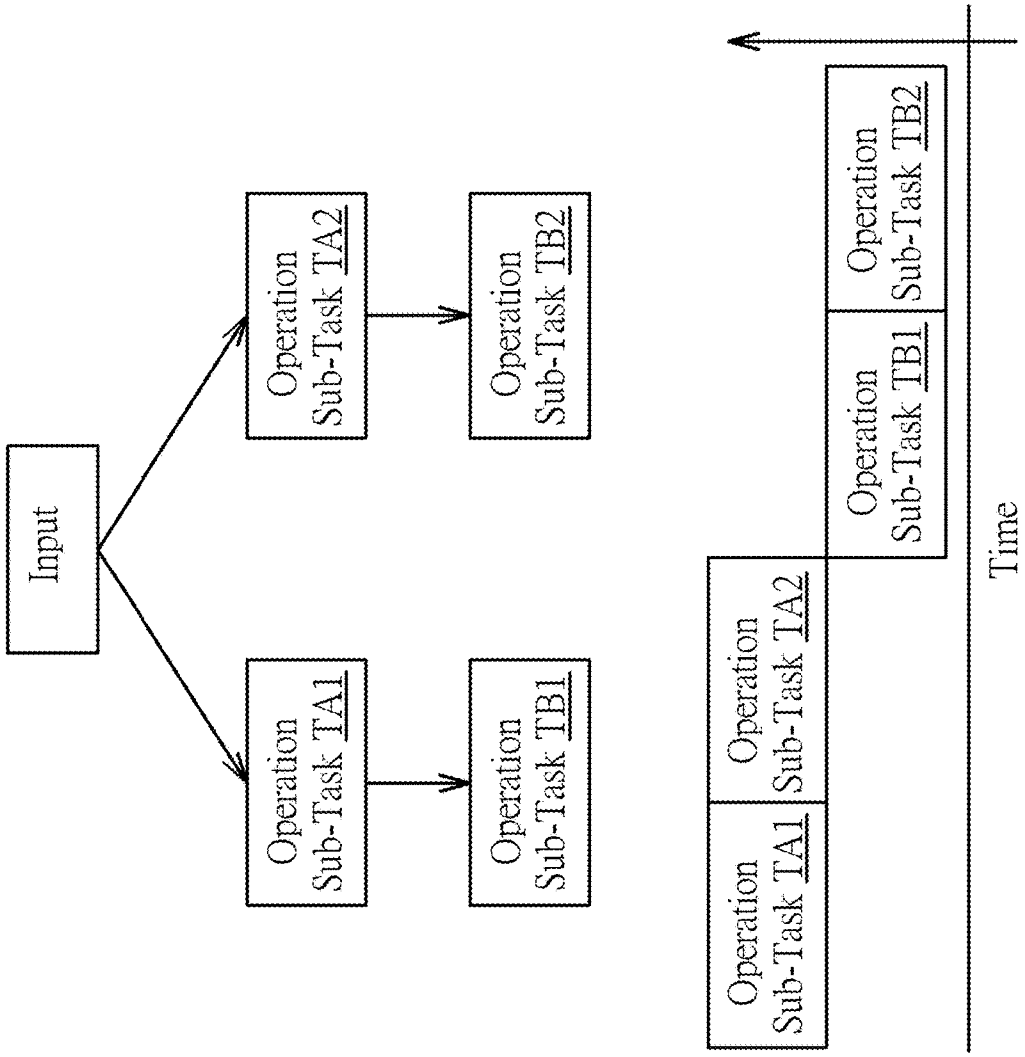
FIG. 2B illustrates a tiled tensor graph of a tensor graph configuration system in FIG. 1 after operation tasks are tiled.
Figure 2A:
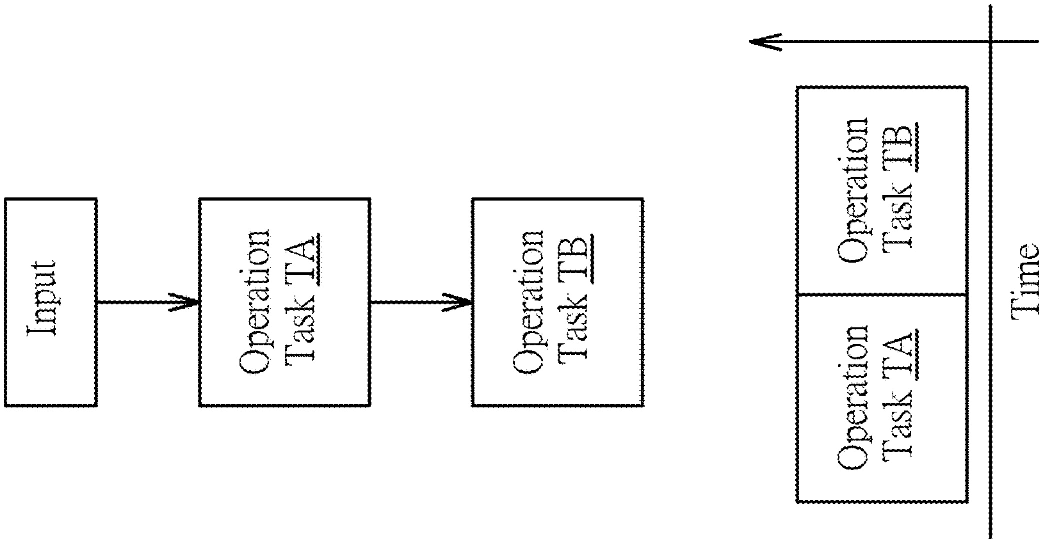
FIG. 2A illustrates an original tensor graph provided by the tensor graph configuration system in FIG. 1 through a graphical user interface.
Figure 2C:
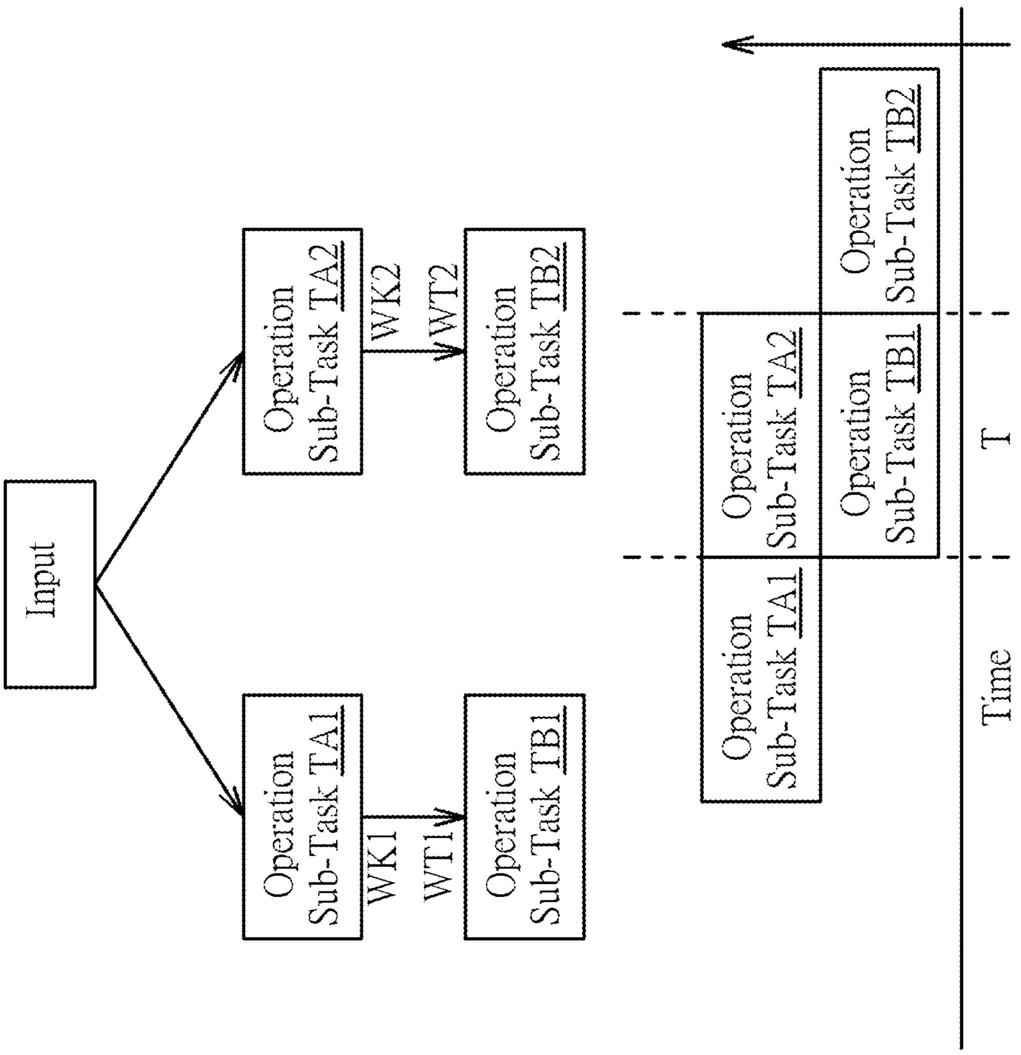
FIG. 2C illustrates a tiled and pipelined tensor graph of the tensor graph configuration system in FIG. 1 after the operation tasks are tiled and pipelined.

FIG. 2A illustrates an original tensor graph provided by the tensor graph configuration system 100 through GUI. FIG. 2B illustrates the tiled tensor graph after the operation tasks TA and TB are tiled. FIG. 2C illustrates the tiled and pipelined tensor graph after the operation tasks TA and TB are tiled and pipelined. As previously mentioned, the tensor graph can be regarded as the topology illustration of data processing flows of the plurality of operation tasks. In one example, OPs within a sub-graph can be executed by different hardware devices (also can be referred to different "hardware engines"). For example, a first operation task can be performed by a first hardware device. A second operation task can be performed by a second hardware device. The first hardware device and the second hardware device are different. For example, in FIG. 2A, an operation task TA can be a process of converting Bayer data to three primary color (RGB) data. An operation task TB can be a two-dimensional (2D) convolution image processing task. Therefore, when machine codes derived from the tensor graph as shown in FIG. 2A is performed on the tensor processing unit (such as, an AI accelerator), after the operation task TA receives input data, the operation task TA can be performed by the first hardware device. Then, after the operation task TA is complete, the operation task TB can be performed by the second hardware device.

In FIG. 2B, the operation tasks TA and TB in FIG. 2A are tiled by the processor 12. For example, the operation task TA can be split into an operation sub-task TA1 and an operation sub-task TA2. The operation task TB can be split into an operation sub-task TB1 and an operation sub-task TB2. Hence, when the machine code derived from the tiled tensor graph as shown in FIG. 2B is performed on the tensor processing unit (such as, the AI accelerator), after the operation sub-task TA1 receives the input data, the operation sub-task TA1 can be performed by the first hardware device. Then, after the operation sub-task TA1 is complete, the operation sub-task TA2 can be performed by the first hardware device. Then, after all operation sub-tasks corresponding to the operation task TA are complete, the operation sub-task TB1 can be performed by the second hardware device. Then, after the operation sub-task TB1 is complete, the operation sub-task TB2 can be performed by the second hardware device. In FIG. 2B, since the branch of the original data flow in FIG. 2A is tiled by the processor 12, memory requirements can be reduced.

In FIG. 2C, the branch of the original data flow in FIG. 2A is tiled and pipelined by the processor 12. Compared with FIG. 2B, as shown in FIG. 2C, a first wake-up signal WK1 can be applied/configured for the operation sub-task TA1, wherein the first wake-up signal WK1 is used to indicate that the operation sub-task TB1 is to be awakened upon the completion of operation sub-task TA1. A first wait signal WT1 can be applied/configured for the operation sub-task TB1, wherein the first wait signal WT1 is used to indicate that the execution of operation sub-task TB1 should await the completion of operation sub-task TA1. A second wake-up signal WK2 can be applied/configured for the operation sub-task TA2, wherein the second wake-up signal WK2 is used to indicate that the operation sub-task TB2 is to be awakened upon the completion of operation sub-task TA2. A second wait signal WT2 can be applied/configured for the operation sub-task TB2, wherein the second wait signal WT2 is used to indicate that the execution of operation sub-task TB2 should await the completion of operation sub-task TA2. Hence, when the machine codes derived from the tiled and pipelined tensor graph as shown in FIG. 2C is performed on the tensor processing unit (such as, the AI accelerator), the operation sub-task TA1 is performed by the first hardware device. After the operation sub-task TA1 is complete, the operation sub-task TA2 and the operation sub-task TB1 can be performed simultaneously by different hardware devices through the coordination of the wake-up signals and wait signals. After the operation sub-task TA2 and the operation sub-task TB1 are complete, the operation sub-task TB2 can be performed by the second hardware device through the coordination of the wake-up signal WK2 and wait signal WT2. As a result, since the operation tasks TA and TB in FIG. 2A are tiled and pipelined by the processor 12, wherein the original operation task is tiled into smaller operation sub-tasks (i.e., output tensor size of an operation sub-task is less than that of the original operation task) and some operation sub-tasks (for example, operation sub-tasks TA2 and TB1) can be executed by different hardware devices in parallel (pipeline), the DRAM utilization requirement can be reduced and processing efficiency is improved (for example, the execution time is reduced), when the machine code derived from the updated/adjusted (tiled and pipelined) tensor graph is executed by a tensor processor unit (such as, an AI accelerator). This smaller data set may be accommodated within the cache of the tensor processor unit, obviating the requirement of DRAM utilization.

In another embodiment, the operation tasks within a sub-graph also can be executed by the same hardware device, further, the pipelining as shown in FIG. 2C can be omitted. Similarly, since the operation tasks TA and TB in FIG. 2A are tiled into smaller sub-tasks (for example, its output tensor is smaller), the DRAM utilization requirement can be reduced when the machine code derived from the tiled tensor graph is executed by a tensor processor unit (such as, an AI accelerator). For the sake of clarity and brevity, the embodiments are illustrated by examples comprising various hardware devices. Details of applying a tiling mechanism and a pipelining mechanism to operation tasks of the tensor graph through the graphical user interface are illustrated below.

Figure 3:
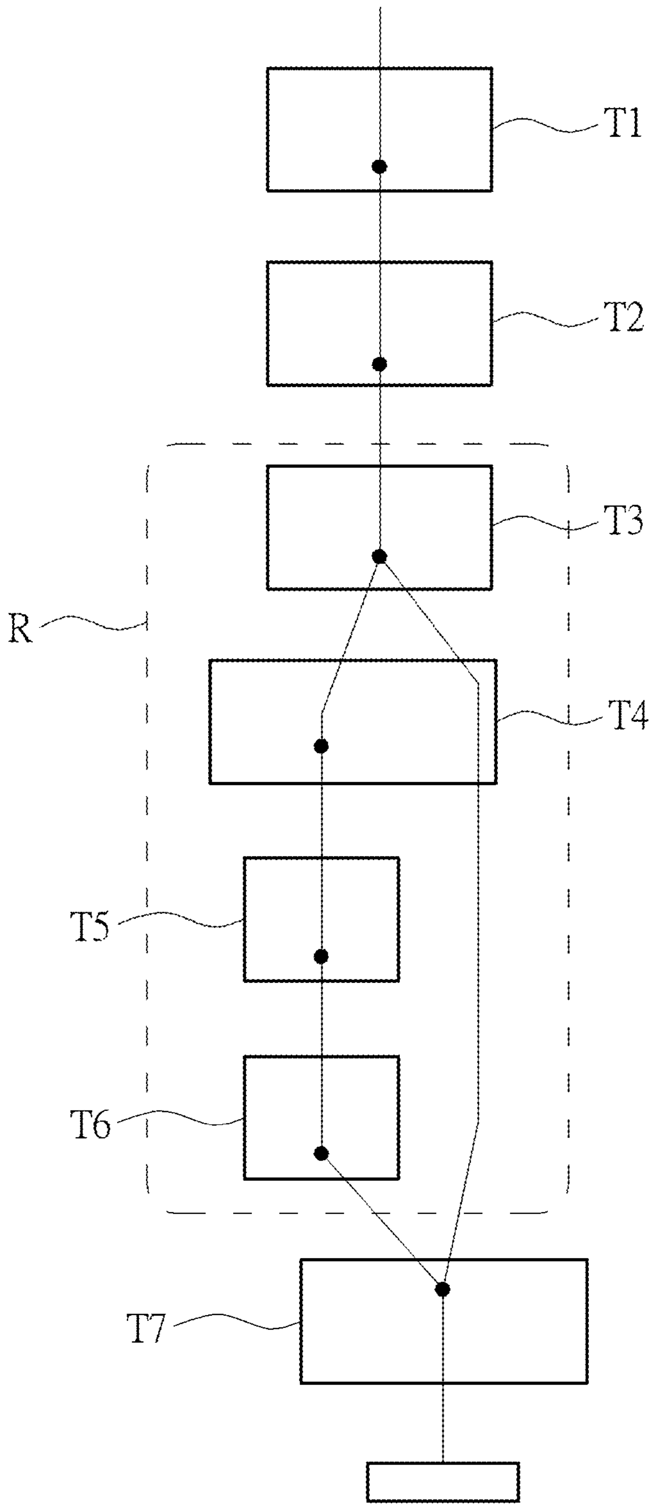
FIG. 3 is an illustration of determining a sub-graph within the tensor graph through the graphical user interface of the tensor graph configuration system in FIG. 1.

FIG. 3 is an illustration of determining the sub-graph within the tensor graph through the graphical user interface of the tensor graph configuration system 100. In FIG. 3, a plurality of operation tasks T1 to T7 can be introduced. The plurality of operation tasks T1 to T7 can be displayed through the graphical user interface (GUI). The processor 12 can generate a range R of the tensor graph through the GUI. Here, the range R can be user-defined for selecting at least one operation task. After the range R is generated, the processor 12 can determine the sub-graph based on the range R. For example, the tensor graph includes the operation tasks T1 to T7. The sub-graph includes a subset of the operation tasks T1 to T7, such as including the operation tasks T3, T4, T5, and T6. Alternatively, the sub-graph can be determined by any reasonable selection method. In the embodiment, the sub-graph may be defined as a collection of operation tasks within the range R, where the range R is delineated by the user through direct interaction with the tensor graph via the GUI, specifically by encircling the desired area.

Figure 4:
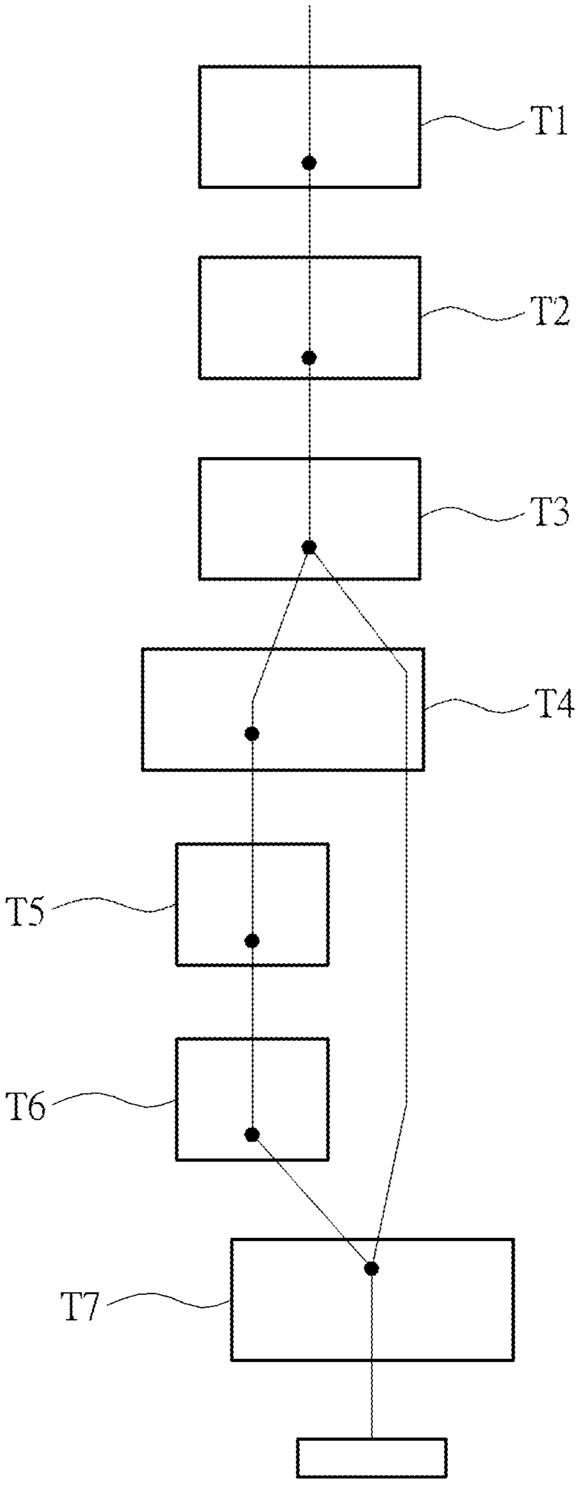
FIG. 4 is an illustration of selecting a first operation task and a second operation task of the tensor graph for determining the sub-graph through the graphical user interface of the tensor graph configuration system in FIG. 1.

FIG. 4 is an illustration of selecting a first operation task T2 and a second operation task T7 of the tensor graph for determining the sub-graph through the graphical user interface of the tensor graph configuration system 100. In FIG. 4, the plurality of operation tasks T1 to T7 can be introduced. The plurality of operation tasks T1 to T7 can be displayed on the graphical user interface. Then, the processor 12 can determine the first operation task T2 in the tensor graph through the graphical user interface. The first operation task T2 can be user-defined through GUI. Similarly, the processor 12 can determine the second operation task T7 in the tensor graph through the graphical user interface. The second operation task T7 can be user-defined through GUI. Therefore, the processor 12 can detect a first task set including all forward-reachable operation tasks derived from the first operation task T2. For example, when the first operation task T2 is determined, the first task set can be expressed as {T2, T3, T4, T5, T6, T7}. Further, the processor 12 can detect a second task set including all backward-reachable operation tasks derived from the second operation task T7. For example, when the second operation task T7 is determined, the second task set can be expressed as {T7, T6, T5, T4, T3, T2, T1}. Then, the processor 12 can determine the sub-graph by intersecting the first task set {T2, T3, T4, T5, T6, T7} and the second task set {T7, T6, T5, T4, T3, T2, T1}. As a result, the sub-graph can be determined to include the operation tasks {T2, T3, T4, T5, T6, T7}. Here, the first operation task T2 can be regarded as a beginning/initial operation task in the sub-graph. The second operation task T7 can be regarded as an end/final operation task in the sub-graph.

Figure 5:
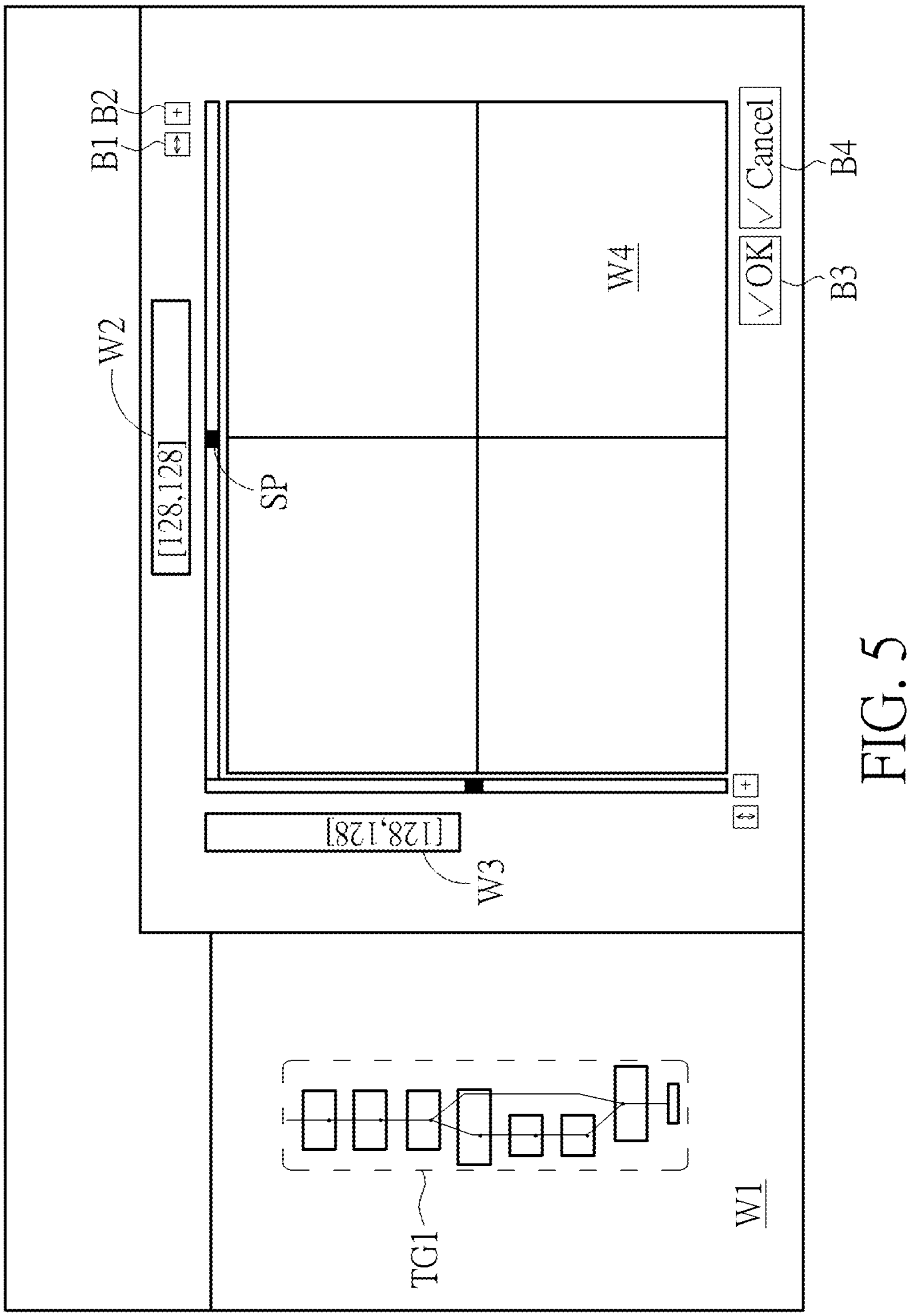
FIG. 5 is an illustration of the graphical user interface of the tensor graph configuration system in FIG. 1.

FIG. 5 is an illustration of the graphical user interface of the tensor graph configuration system 100. As previously mentioned, the tensor graph TG1 can be displayed on a window W1 of the graphical user interface. In the embodiment, the tiling configuration for all operation tasks within the sub-graph can be determined based on multiple target tensor sizes for the final operation task in the sub-graph, wherein the multiple target tensor sizes can be user-defined through the GUI. Here, the multiple target tensor sizes of the final operation task in the sub-graph can be adjusted by dragging a split point SP displayed on the graphical user interface or inputting values of the target tensor sizes to windows W2 and W3 displayed on the GUI. The window W2 can be used for inputting the target tensor sizes on a horizontal axis. A window W3 can be used for inputting the target tensor sizes on a vertical axis. The window W2 and the window W3 can also be used for displaying current tiling dimensions of the sub-graph of the tensor graph TG1. A window W4 as shown in FIG. 5 can be used for displaying tiling examples of the final operation task. A button B1 can be used for performing an equally splitting process of the sub-graph of the tensor graph TG1. A button B2 can be used for introducing a new split point for the final operation task within the sub-graph. A button B3 is a confirmation button. A button B4 is a cancel button. After the multiple target tensor sizes for the final operation task in the sub-graph are determined, the processor 12 can determine a tiling configuration for the final operation tasks in the sub-graph, and as previously mentioned, tiling configurations for other operation tasks in the sub-graph can also be determined, for example, based on a preset backward shape derivation algorithm. Hence, the processor 12 can virtually split each branch of the sub-graph into a plurality of tiling branches according to the multiple target tensor sizes of the final operation task within the sub-graph or the tiling configuration for all operation tasks in the sub-graph. Details are illustrated later.

Figure 6:
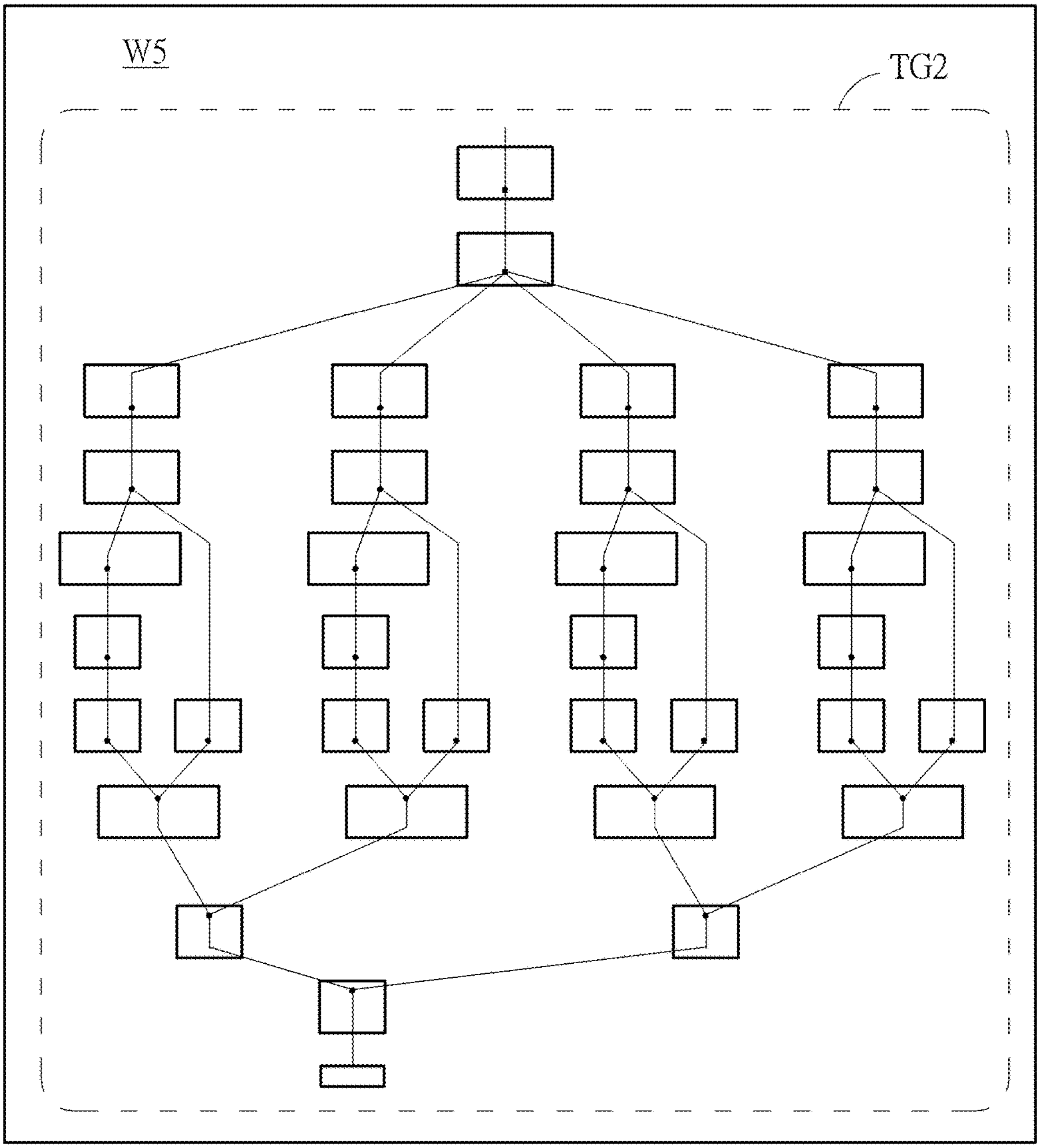
FIG. 6 is an illustration of an updated or tiled tensor graph of the tensor graph configuration system in FIG. 1 after the tensor graph is adjusted through the graphical user interface.

FIG. 6 is an illustration of an updated or tiled tensor graph of the tensor graph configuration system 100 after the tensor graph is adjusted through the GUI. In FIG. 6, the branch of the sub-graph of the tensor graph TG1 is split into four branches. Each of the four branches can be executed one after another. After the branch of the sub-graph of the tensor graph TG1 is split by the processor 12, an updated or tiled tensor graph TG2 can be displayed on a window W5 through the graphical user interface. Further, since each branch requires less memory to compute, memory requirements of OPs of the updated tensor graph TG2 can be reduced. Cache-thrashing can also be reduced.

Figure 7:
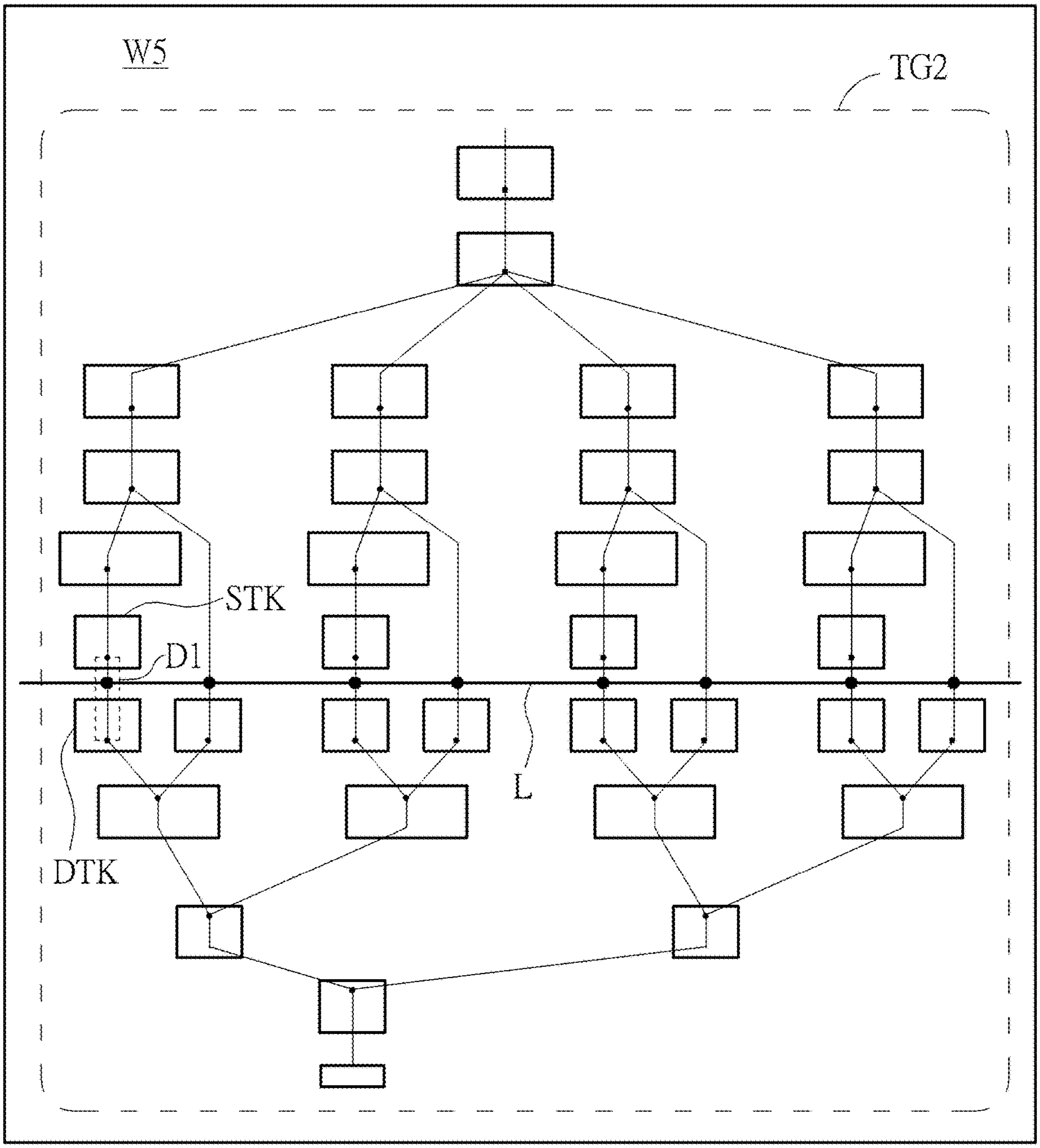
FIG. 7 is an illustration of creating a pipeline mechanism for an updated tensor graph through the graphical user interface of the tensor graph configuration system in FIG. 1.

FIG. 7 is an illustration of creating the pipeline mechanism for the updated tensor graph TG2 through the graphical user interface of the tensor graph configuration system 100. After the updated tensor graph TG2 is generated, wake-up signals and wait signals can be applied to the updated tensor graph TG2 through the GUI for creating the pipelining mechanism, as illustrated below. The processor 12 can generate a line (or path) L for splitting the plurality of OPs of the updated tensor graph TG2 through the GUI. The line L can be user-defined through GUI. Then, the processor 12 can identify at least one data flow edge in the updated tensor graph according to the line L, for example, the at least one data flow edge intersects the line L in the updated tensor graph. Then, the processor 12 can allocate the wake-up signal and the wait signal to the updated tensor graph TG2 according to the at least one data flow edge. For example, for the data flow edge D1 as shown in FIG. 7, the processor 12 can allocate the wake-up signal after a source OP of the data flow edge D1. As shown in FIG. 7, the source OP of the data flow edge D1 is an operation sub-task STK. The processor 12 can allocate the wait signal before a destination OP of the data flow edge D1. As shown in FIG. 7, the destination OP of the data flow edge D1 is an operation sub-task DTK. Particularly, the source OP (such as operation sub-task STK) and the destination OP (such as operation sub-task DTK) are two adjacent OPs related to the data flow edge D1. The source OP is executed by a hardware device. The destination OP is executed by another hardware device. In the embodiment, the wake-up signal is used to indicate the destination OP (such as operation sub-task DTK) is to be awakened upon the completion of source OP (such as operation sub-task STK), and the wait signal is used to indicate that the execution of the destination OP (such as operation sub-task DTK) should await the completion of source OP (such as operation sub-task TA1). Hence, in the proposed embodiment, the capability is provided through the graphical user interface (GUI) to allow users to drag a line for splitting the updated tensor graph TG2. The line may be a curved line or straight line hence, the wake-up signals and the wait signals can be easily allocated to the updated tensor graph TG2 for creating the pipelining mechanism. Since the pipelining mechanism can be introduced, the processing efficiency can be improved.

Figure 8:
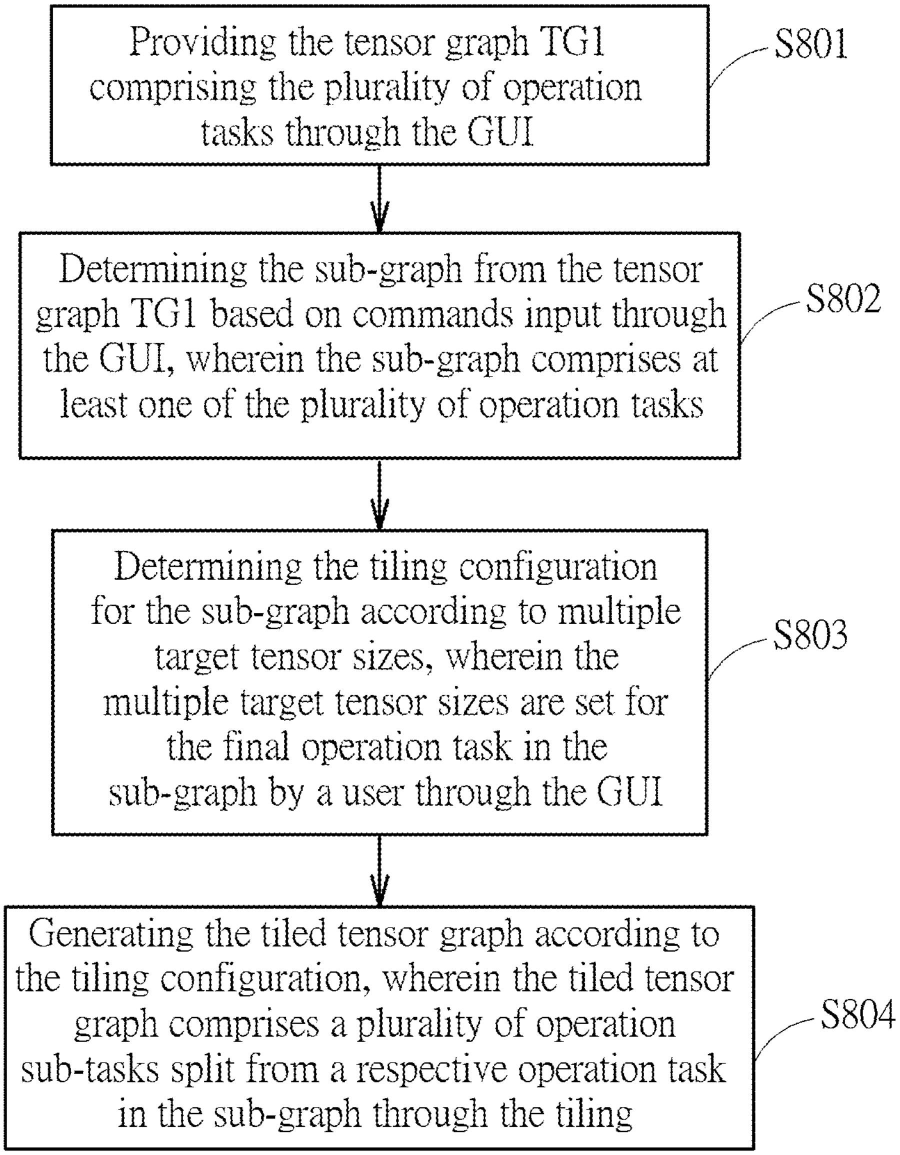
FIG. 8 is an illustration of performing a tensor graph configuration method by the tensor graph configuration system in FIG. 1.

FIG. 8 is an illustration of performing a tensor graph configuration method by the tensor graph configuration system 100. The tensor graph configuration method includes step S801 to step S804. Any reasonable technology modification falls into the scope of the present disclosure. Step S801 to step S804 are illustrated below.

Step S801: providing the tensor graph TG1 comprising the plurality of operation tasks through the GUI;

Step S802: determining the sub-graph from the tensor graph TG1 based on commands input through the GUI, wherein the sub-graph comprises at least one of the plurality of operation tasks;

Step S803: determining the tiling configuration for the sub-graph according to multiple target tensor sizes, wherein the multiple target tensor sizes are set for the final operation task in the sub-graph by a user through the GUI;

Step S804: generating the tiled tensor graph according to the tiling configuration, wherein the tiled tensor graph comprises a plurality of operation sub-tasks split from a respective operation task in the sub-graph through the tiling.

Details of step S801 to step S804 are previously illustrated. Thus, they are omitted here. In the tensor graph configuration system 100, since the graphical user interface can be used for configuring the tiling mechanism and the pipelining mechanism of the tensor graph, the compiler optimization can be easily achieved. As a result, since the tensor graph can be intuitively adjusted, the memory requirements can be reduced in conjunction with high processing efficiency.

To sum up, the present disclosure discloses a tensor graph configuration method and a tensor graph configuration system. The tensor graph configuration system can use the graphical user interface for intuitively adjusting the tensor graph. For example, the tiling mechanism of the tensor graph can be configured by dragging a splitting point or directly inputting a target tiling size through the graphical user interface. The pipelining mechanism of the tensor graph can be configured by inserting wake-up signals and wait signals according to a line dragged by users. As a result, since the tensor graph can be intuitively adjusted, the memory requirements can be reduced in conjunction with high processing efficiency.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A tensor graph configuration method comprising:

providing a tensor graph comprising a plurality of operation tasks through a graphical user interface (GUI);

determining a sub-graph from the tensor graph based on commands input through the GUI, wherein the sub-graph comprises at least one of the plurality of operation tasks;

determining a tiling configuration for the sub-graph according to multiple target tensor sizes, wherein the multiple target tensor sizes are set for a final operation task in the sub-graph through the GUI; and generating a tiled tensor graph according to the tiling configuration, wherein the tiled tensor graph comprises a plurality of operation sub-tasks split from a respective operation task in the sub-graph through the tiling;

wherein determining the sub-graph from the tensor graph based on commands input through the GUI comprises:

selecting a first operation task of the tensor graph through the GUI;

selecting a second operation task of the tensor graph through the GUI;

detecting a first task set comprising all forward-reachable operation tasks derived from the first operation task;

detecting a second task set comprising all backward-reachable operation tasks derived from the second operation task; and generating the sub-graph by intersecting the first task set and the second task set.

2. The method of claim 1, further comprising:

configuring wake-up signals and wait signals for the tiled tensor graph for establishing a pipelining mechanism through the GUI, to generate a tiled and pipelined tensor graph.

3. The method of claim 1, wherein determining the sub-graph from the tensor graph based on commands input through the GUI further comprises:

generating a range of the tensor graph based on the commands input through the GUI; and determining the sub-graph inside the range.

4. The method of claim 1, further comprising:

adjusting the multiple target tensor sizes for the sub-graph through the GUI; and splitting at least one operation task within the sub-graph into at least one operation sub-task according to the multiple target tensor sizes.

5. The method of claim 4, wherein the multiple target tensor sizes are adjusted by dragging a split point displayed on the GUI, or inputting values of the multiple target tensor sizes to a window displayed on the GUI.

6. A tensor graph configuration method comprising:

providing a tensor graph comprising a plurality of operation tasks through a graphical user interface (GUI);

determining a sub-graph from the tensor graph based on commands input through the GUI, wherein the sub-graph comprises at least one of the plurality of operation tasks;

determining a tiling configuration for the sub-graph according to multiple target tensor sizes, wherein the multiple target tensor sizes are set for a final operation task in the sub-graph through the GUI;

generating a tiled tensor graph according to the tiling configuration, wherein the tiled tensor graph comprises a plurality of operation sub-tasks split from a respective operation task in the sub-graph through the tiling;

generating a line for splitting the plurality of operation sub-tasks through the GUI; and allocating a wake-up signal and a wait signal to the tiled tensor graph according to at least one data flow edge that intersects with the line.

7. The method of claim 6, wherein a source operation sub-task of a data flow edge and a destination operation sub-task of the data flow edge are two adjacent operation sub-tasks, the source operation sub-task is executed by a hardware device, and the destination operation sub-task is executed by another hardware device.

8. The method of claim 7, wherein the wake-up signal is configured to indicate that the destination operation sub-task is to be awakened upon a completion of the source operation sub-task, and the wait signal is configured to indicate that an execution of the destination operation sub-task awaits the completion of the source operation sub-task.

9. A tensor graph configuration system comprising:

a memory configured to save tensor graph data;

a graphical user interface device configured to provide a graphical user interface (GUI); and a processor coupled to the memory and the GUI and configured to adjust a tensor graph comprising a plurality of operation tasks;

wherein the processor is configured to perform the following steps:

determining a sub-graph from the tensor graph based on commands input through the GUI, wherein the sub-graph comprises at least one of the plurality of operation tasks;

determining a tiling configuration for the sub-graph according to multiple target tensor sizes, wherein the multiple target tensor sizes are set for a final operation task in the sub-graph through the GUI; and generating a tiled tensor graph according to the tiling configuration, wherein the tiled tensor graph comprises a plurality of operation sub-tasks split from a respective operation task in the sub-graph through the tiling; and wherein determining the sub-graph from the tensor graph based on commands input through the GUI comprises:

selecting a first operation task of the tensor graph through the GUI;

selecting a second operation task of the tensor graph through the GUI;

detecting a first task set comprising all forward-reachable operation tasks derived from the first operation task;

detecting a second task set comprising all backward-reachable operation tasks derived from the second operation task; and generating the sub-graph by intersecting the first task set and the second task set.

10. The system of claim 9, wherein the processor is further configured to configure wake-up signals and wait signals for the tiled tensor graph for establishing a pipelining mechanism through the GUI, to generate a tiled and pipelined tensor graph.

11. The system of claim 9, wherein the processor is further configured to generate a range of the tensor graph through the GUI, and to determine the sub-graph within the range.

12. The system of claim 9, wherein the processor is configured to adjust the multiple target tensor sizes for the sub-graph through the GUI, and to split at least one operation task within the sub-graph into at least one operation sub-task according to the multiple target tensor sizes.

13. The system of claim 12, wherein the multiple target tensor sizes are adjusted by dragging a split point displayed on the GUI, or inputting values of the multiple target tensor sizes to a window displayed on the GUI.

14. The system of claim 9, wherein the processor is configured to generate a line for splitting the plurality of operation sub-tasks through the GUI, and to allocate a wake-up signal and a wait signal to the tiled tensor graph according to at least one data flow edge that intersects with the line.

15. The system of claim 14, wherein a source operation sub-task of a data flow edge and a destination operation sub-task of the data flow edge are two adjacent operation sub-tasks, the source operation sub-task is executed by a hardware device, and the destination operation sub-task is executed by another hardware device.

16. The system of claim 15, wherein the wake-up signal is configured to indicate that the destination operation sub-task is to be awakened upon a completion of the source operation sub-task, and the wait signal is configured to indicate that an execution of the destination operation sub-task awaits the completion of the source operation sub-task.

* * * * *